United States Patent [19]
Burns

[11] 3,876,374
[45] Apr. 8, 1975

[54] METHOD AND APPARATUS FOR AUTOMATED QUANTITATIVE FLUID ANALYSIS

[75] Inventor: Donald A. Burns, Putnam Valley, N.Y.

[73] Assignee: Technicon Instruments Corporation, Tarrytown, N.Y.

[22] Filed: Mar. 22, 1974

[21] Appl. No.: 453,896

[52] U.S. Cl. ............... 23/230 R; 23/253 R; 23/259; 356/36
[51] Int. Cl. ... G01n 33/16; G01n 1/14; G01n 21/26
[58] Field of Search .......... 23/253 R, 230 R, 230 B, 23/259; 356/36

[56] References Cited
UNITED STATES PATENTS

| | | | |
|---|---|---|---|
| 3,698,870 | 10/1972 | De Jong | 23/253 R |
| 3,784,310 | 1/1974 | Barton | 23/253 R |
| 3,804,593 | 4/1974 | Smythe et al. | 23/253 R |
| 3,826,615 | 7/1974 | Smythe et al. | 23/230 R |

Primary Examiner—R. E. Serwin
Attorney, Agent, or Firm—S. P. Tedesco; Stephen E. Rockwell

[57] ABSTRACT

Method and apparatus for reaction-rate analysis wherein a fluid sample, which has been treated to undergo a reaction, is flowed into a conduit and then flowed out of the conduit in the reverse direction so that the first sample portion which enters the conduit is the last sample portion to leave the conduit. The outflow of the conduit is to an analysis station wherein a constituent of interest of the sample is quantitatively analyzed.

34 Claims, 2 Drawing Figures

METHOD AND APPARATUS FOR AUTOMATED QUANTITATIVE FLUID ANALYSIS

BACKGROUND OF THE INVENTION

1. Field of the Invention.

This invention relates to automated analysis including flowing sequentially a series of fluid samples separated from one another by immiscible fluid segments through a conduit toward an analysis station for quantitative analysis in any well-known manner such as by analysis by optical density, by an electrochemical technique or any other conventional type of quantitative analysis.

2. Prior Art.

Heretofore, automated methods have been employed for the quantitative chemical analysis of a constituent of a series of different samples flowing in a stream which samples are separated from one another by immiscible fluid segments such as liquids, gas or air bubbles. Apparatus for carrying out such an automated method is described in Skeggs U.S. Pat. No. 2,797,149 issued June 25, 1957 and by Skeggs U.S. Pat. No. 2,879,141 issued Mar. 24, 1959. Skeggs et al U.S. Pat. No. 3,241,432 issued Mar. 22, 1966 illustrates a multichannel quantitative analyzer for performing a plurality of tests on each one of a series of samples flowing one after another. In such apparatus, the stream was "debubbled" or "vented" of immiscible fluid segments in the sample stream before passing through an analysis station which, as illustrated in those patents, included a colorimeter flow cell, operative during the flow of the sample stream through the flow cell.

In co-pending Smythe and Shamos U.S. Pat. application, Ser. No. 369,695 filed on May 25, 1964, now U.S. Pat. No. 3,804,593 assigned to the assignee of the instant invention, there were pointed out the significant advantages in passing sequentially through a flow cell a series of samples in a stream segmented with segments of an immiscible liquid, for better cleaning of the wall structure of the flow cell by such segments, as well as other portions of the ductwork, which cleaning enables analysis at higher analytical rates by a significant reduction of contamination of one sample by a preceding sample. Such throughput in an analysis station of such a segmented stream is now common in other types of automated analysis, that is, not utilizing colorimetry. In the particular type of analysis involved in the utilization of the present invention, it is preferred to "debubble" or "vent" immiscible fluid segments prior to analysis, but the invention is in no way limited thereto.

Rate-reaction analysis is shown in Burns co-pending U.S. patent application Ser. No. 392,156 filed Aug. 27, 1973, assigned to the assignee of the instant invention. In one of its aspects it involves the feature of "stopped-flow" at the analysis station. In certain analytical situations, it is desirable to avoid "stopped flow." Further, the method and apparatus of the instant invention may be characterized as simpler and less expensive.

In at least one aspect of the present invention, it is desired to utilize the advantageous aspects of continuous-flow analysis including employment of inert, immiscible fluid segments in samples flowing successively in a stream and separated from one another, for scrubbing action of such segments on the walls of the transmitting tubing.

As shown in de Jong U.S. Pat. No. 3,134,263 issued May 26, 1964, it is now common to aspirate a series of samples one after another each sample being in a separate cup and being aspirated through a probe at an offtake station of such sample supply device. A reservoir for a wash solution is provided on such sample supply device which aspirates through the probe the wash solution therein intermediate aspiration of successive samples of the supply device. As the probe, under the action of a continuously-operating pump, is lifted out of one sample it aspirates an air segment prior to immersion of the probe in the wash receptacle. When the probe leaves the wash solution on its travel to the following sample cup, then indexed at the sample offtake position, it again aspirates an air segment before aspiration of sample from the last-mentioned cup. This provides in a conduit extending from the probe, and under the influence of the aforementioned pump, a series of samples flowing one after another, which may be body fluids such as blood, for example, but not by way of limitation. Each sample has between it and its neighbor a pair of gas segments between each of which gas segments there is disposed a segment of wash solution.

SUMMARY OF THE INVENTION

One object of the invention is to provide an improved method and apparatus for rate-reaction analysis sequentially of a series of fluid samples, each over a period of time, utilizing advantageous aspects of continuous-flow techniques, enabling analysis of such samples on a continuous-flow basis while enabling avoidance of analysis under the aforementioned stopped-flow condition.

An optional feature of the invention is that it also enables the passage of immiscible fluid segments such as gas through the analysis station, effectively tending to reduce contamination of a following sample by a preceding sample and requiring a smaller volume of sample because of an avoidance of the necessity of part of one sample to wash out the remainder of the preceding sample. This may result in higher analytical rates.

Still another object of the invention is that a sample supply device such as previously described may be utilized to supply a sample stream to a plurality of analysis stations arranged in parallelism with reference to one another for simultaneous analyses at such stations.

Yet another advantage is that the method and apparatus enables an analysis of a rate reaction over a period of time as in kinetic enzyme determinations.

Further, it may include two temperature-controlled sample conduits, which may take the form of coils, which are alternately fed by the aforementioned sample supply device and alternately emptied into an analysis station associated therewith. The last-characterized feature of the invention enables the flow first into the corresponding one of such coils of a first sample portion and the transmission from such coil to the analysis station of such first sample portion in a last position. In other words, the first sample portion which enters one of such coils, on reversal of the flow in the coil is the last sample portion to leave the last-mentioned coil and flow to the analysis station. The second sample flows into the second coil and its flow is subsequently reversed for transmission of the second sample to the analysis station. The last-mentioned feature further includes what is referred to herein as an "apparent" incubation reaction-rate-amplification and may be performed by emptying each of such coils to the analysis station at a faster flow rate than the flow rate of sample into such coil. Still further, the last-mentioned feature avoids utilization of a dual-speed pump, and/or the valving-in of a higher velocity stream.

DETAILED DESCRIPTION OF THE PREFERRED EMBODIMENTS

Figures 1, 2:
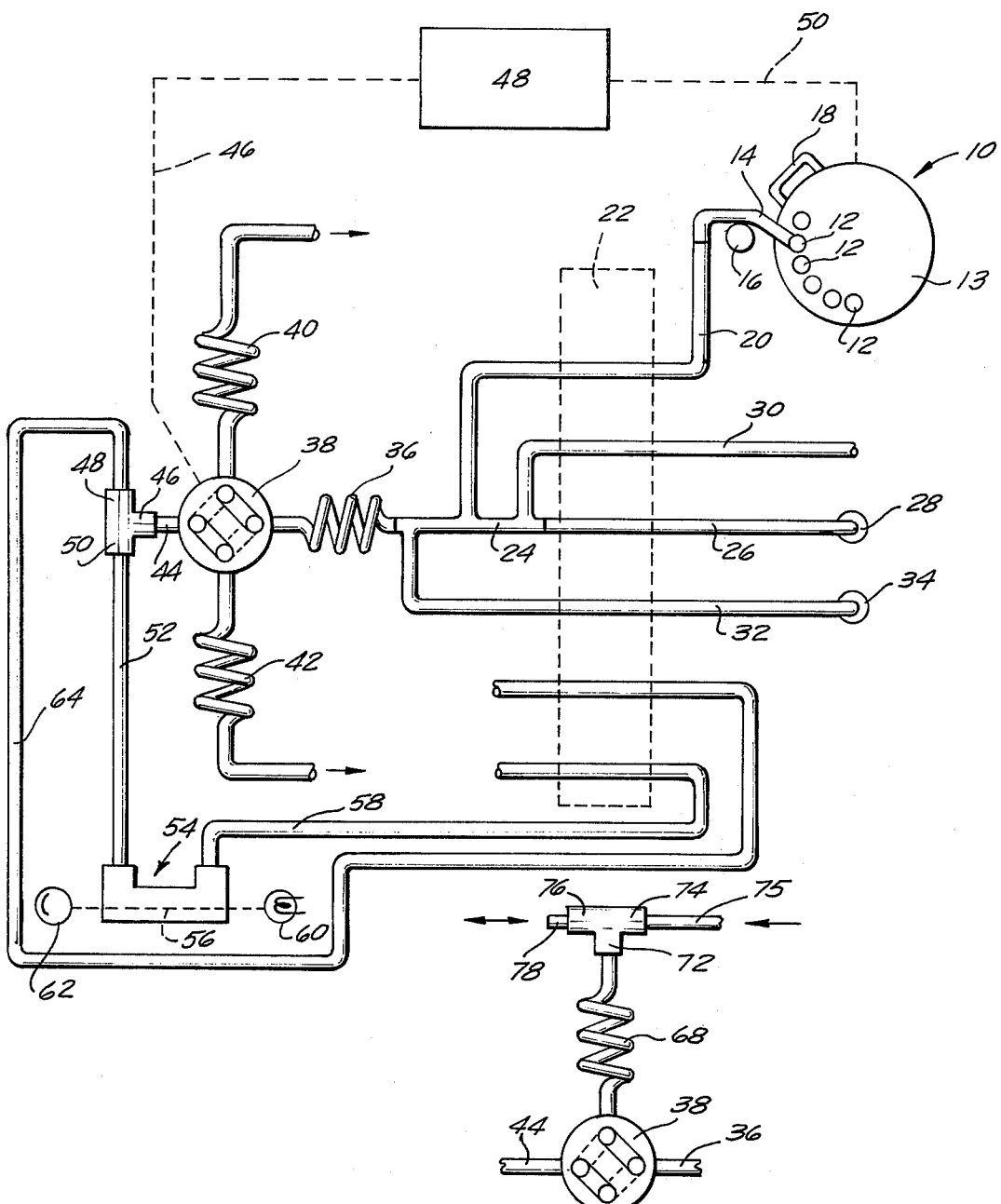
FIG. 1 is a somewhat diagrammatic view of analysis apparatus embodying the invention.
FIG. 2 is a fragmentary diagrammatic view illustrating a modification of the invention.

In FIG. 1 there is shown a sample supply device, indicated generally at 10, having a series of sample cups 12 each of which may be indexed on angular movement of a supporting tray 13 to an offtake position with reference to an aspirating probe 14 on movable support 16. The probe 14 cooperates alternately with the sample cup indexed thereat and the wash solution reservoir indicated at 18. The probe has coupled to its outlet end the inlet end of compressible pump tube 20 which extends through pump 22 which may be of the conventional peristaltic type. In view of the foregoing description of the sample supply device 10 and the reference to de Jong U.S. Pat. No. 3,134,263, supra, no further description is deemed necessary to understand the operation of the sample supply device 10 and its function to provide a segmented sample stream in compressible pump tube 20, such as previously described. The outlet end of compressible pump tube 20 is coupled intermediate the ends of tube 24.

The inlet end of tube 24 is coupled to the outlet end of compressible pump tube 26 which extends through the pump 22 and has its inlet end coupled to a source 28 of, for example, buffer and co-enzyme solution. The samples from the sample cups 12 may take the form of blood serum and the constituent of interest may be L.D.H., for example. A compressible pump tube 30 extends through the pump 22 for delivery through its inlet end of a fluid such as air for example. The outlet end of tube 30 is connected to tube 24 upstream of the connection of the tube 20 to the tube 24. A compressible pump tube 32 extends through the pump having its inlet end disposed in a source 34 of substrate solution, for example. The outlet end of tube 32 is connected to tube 24 downstream from the junction of the outlet of the tube 20 with the tube 24. For purposes of example only, the flow rate through the tube 20 may be 0.13 ml/min., that through the tube 30 0.32 ml/min., that through tube 26 0.60 ml/min. and that through tube 32 0.60 ml/min. It is to be clearly understood that the air or gas introduced into the system through the conduit 30 provides segments thereof of sufficient size to occlude the tube 30 and all ductwork downstream thereof and in communication with the tube 30. The air segments admitted to the tube 30 segmentize each sample.

The streams from the aforementioned tubes combine in the tube 24 which may have an outlet end connected to the inlet of conduit 36 which may take the form of a mixing coil and may be temperature-controlled in a non-illustrated manner. It is to be understood that the aforementioned substances, which flow through the previously described fluid lines, are thoroughly mixed in the coil 36, if used, while the aforementioned segmentation of the sample stream is maintained.

The outlet end of the coil 36 is connected to an inlet port of a four-way solenoid-operated valve 38. The valve 38 is alternately shifted 90° in opposite directions. In FIG. 1 the input to the valve 38 from the coil 36 is directed to the input of coil 40 while the output from coil 42 through the valve is coupled to the input end of conduit 44. For purposes of explanation, the valve 38 shown in FIG. 1 is in condition to deliver the second sample to the coil 40 while emptying the first sample from the coil 42 through the valve 38 to the input of conduit 44. As soon as the coil 40 is filled, and overflows somewhat as will be explained in more detail hereinafter, and the coil 42 is drained in the aforementioned matter, the valve 38 is shifted to supply the coil 42 with the third segmented sample. These cycles are repeated until all of the segmented samples have been inletted to the conduit 44, and the valve 38 is phased to the arrival of each sample thereat, the construction and arrangement being through a lead 46 having an output from a controller 48 which has an input to lead 50 from the sample supply device 10, such as to tie the movements and actions of the sample supply device 10 to the arrival of successive samples at the valve 38. The controller 48 may take the form of a timer or a programmer.

As previously indicated the coils 40 and 42 may conveniently take the form of temperature-controlled coils each having the end thereof remote from the valve 38 discharging to waste.

In the illustrated form, the outlet of the conduit 44 extending from the valve 38 is coupled to the side inlet arm 46 of a debubbler or vent for eliminating from the sample stream all of the aforementioned immiscible fluid segments therefrom such as gas. The arm 46 is in communication with an upwardly arranged arm 48 which constitutes a vent for the immiscible fluid segments such as gas in the sample stream, while the arm 46 is also in communication with lower arm 50 through which flows the sample stream free of such immiscible fluid segments. The outlet of the lower arm 50 of the vent is connected to the inlet of a tube 52 having an outlet coupled to the inlet of an analysis station, indicated generally at 54, and which in the illustrated form is shown as a colorimeter flow cell.

The axis of the sight path of the flow cell is indicated at 56. The liquid outlet of the analysis station 54 is coupled to the inlet of a compressible tube 58 having a volumetric flow rate of 1.20 ml/min. The tube 58 extends through the pump 22 and has an outlet to waste. At one end of the aforementioned sight path there is located a lamp 60 for emission of light therefrom for travel along the sight path to a photodetector 62. The photodetector 62 is connected to conventional non-illustrated data processing equipment which in turn has an output to the input of a non-illustrated analysis display device of a suitable type. The pump tube 58 extends through tube 22 and has an outlet end discharging to waste.

The immiscible fluid segments of the stream entering the arm 46 and which may take the form of gas as previously indicated may be exhausted to waste at atmospheric pressure. However, in the illustrated form, suction is applied to remove these gas segments through compressible pump tube 64 having an inlet end coupled to the outlet of arm 48, which pump tube 64, having a volumetric flow rate of 0.42 ml/min., extends through pump 22 and has an outlet to waste.

In the form shown by way of example samples may be analyzed at a rate of 60/hour with a ratio of sample:-wash of 3:1. This means that at this analytical rate and at this ratio of sample:wash each sample is aspirated for approximately 45 seconds and wash between samples is aspirated over a period of 15 seconds. It may be assumed, for purposes of example, that the capacity of each of the coils 40 and 42 is 1.2 ml. (about 75% of the total volume per cycle) and that the timing is so adjusted that 15 seconds of wash, equivalent to 0.45 ml, passes through each coil to waste through the end thereof remote from the valve 38. This leaves the corresponding sample of the filled coils 40, 42 with that portion of the sample that is aspirated from the corresponding cup within the last-mentioned 45 seconds including the volume of the air segments.

The aforementioned wash overflow as previously indicated on the filling of each coil 40, 42 effectively tends to remove any contamination of that coil by a preceding sample. The segmentation of each sample within the corresponding filled coil also greatly facilitates the wash of the last-mentioned coil to free it from such contamination. It is further theorized that, because each segmented sample is flowed into one of the aforementioned coils 40, 42 at one time and that the flow is reversed to remove such sample from such coil, that carry-over or contamination of one sample or sample segment by a neighboring sample or sample segment is even further reduced, and may in fact be cancelled out entirely, which is a significant feature in continuous-flow analysis.

It has been previously mentioned that outflow from each of the coils 40, 42 may be faster than the flow into such coils. The fluid-removal rate may be three times faster for example. If such is the case, there is an apparent rate amplification of 4. In other words, if the fluid which took 45 seconds to flow into one of the corresponding coils 40, 42 is outletted from such coil in 15 seconds the first portion of the sample flowed into the last-mentioned coil resides in that coil for a total of 60 seconds while the last portion of the same sample resides therein for virtually zero seconds. If the reacting mixture in the corresponding coil 40 or 42 is changing its absorbance rate at a rate of 0.1 Abs/min, then the apparent change of 0.1 Abs/15 sec., or 0.4 Abs/min., produces an apparent rate-amplification of 4. The aforementioned speed change in filling and emptying the corresponding coils 40, 42 is accomplished by the appropriate volumetric flow-rating of the conduits 44, 52, 64 and 58, and can be defined as follows:

Rate Gain = Rate Out/Rate In + 1, even if the coils are emptied at the same rate as they are filled, there is an apparent doubling of the reaction rate.

In the modification of the invention shown in FIG. 2 there is still further improvement of the washout of the aforementioned alternately operating coils. Identical reference numerals are used in FIG. 2 to identify identical parts. As in the form previously discussed the valve 38 having an inlet from the coil 36 is operated in an identical manner to alternately fill and drain coils 68 and 70 similar to the coils 40, 42, respectively, previously discussed. Unlike the form of FIG. 1 the end of coil 68 remote from the valve 38 is connected to inlet-outlet arm 72 of a T fitting which has an arm 74 having an inlet end connected to the outlet end of a conduit 75 for a wash solution such as water which may be supplied under pressure in any conventional manner not shown. The T fitting also has an arm 76 which is both an inlet and outlet as will appear hereinafter. To this arm 76 is connected an inlet and outlet end of a short tube 78. The other end of the tube 78 is also an inlet and an outlet.

The construction and arrangement at the corresponding end of the coil 70 is identical. Similarly the end of the coil 70 remote from the valve 38 is connected to the inlet-outlet arm 80 of a T fitting which has an inlet arm 82 to which is connected the inlet end of a tube 84 for conveying wash solution such as water and which may be supplied under pressure in a conventional manner. The third arm of the T fitting, indicated at 86 is both an inlet and an outlet, and to it is connected an inlet-outlet end of a short length of tube 88, the other end of which is also an inlet and outlet.

The operation of the form of the invention shown in FIG. 2 is very similar to that previously described with reference to the form of FIG. 1 with only these exceptions: In the condition of the valve 38 shown in FIG. 2, the coil 68 is filled by the preceding wash solution, followed by sample No. 2, entering arm 72 of the T fitting, and the wash solution escapes to waste from the short tube 78 through the arm 76. Even during the filling of the coil 68, as aforesaid, the wash solution of a suitable volume and pressure is continuously admitted from a suitable non-illustrated source to the inlet of conduit 75, and during this period such admitted wash solution and excess sample flows to waste through the tube 78. When the valve 38 is also in the last-mentioned condition the contents of the coil 70 are emptied in a direction toward the analysis station 54, while the coil 68 is being supplied with the segmented, treated sample mixture by the valve 38. The wash solution admitted to the inlet of the tube 84, flows into the arm 82 of the T fitting and out the arm 80, following the treated segmented sample mixture in the coil 70.

Depending on the volumetric flow rate of the coil 70 while it is being drained and the volumetric input into the tube 84, the wash solution following the aforementioned segmented sample mixture in coil 70 may be either unsegmented with gas or may be segmented by gas entering the tube 88 and the arm 86 and passing into the coil through the arm 80 in the T fitting. For example, if the wash solution is admitted to the conduit 84 at the rate of 5 ml/min. and is emptied at 4 ml/min., the wash solution following the sample mixture in coil 70 may be unsegmented. On the other hand, if the input of the wash solution to the conduit 84 is at the rate of 3 ml/min., the wash solution following the sample mixture in the coil 70 as it leaves the coil may be segmented by gas segments from conduit 88 further reducing the risk of contamination or carryover of sample from one of the coils 68, 70 to the next following sample therein. It will be understood from the foregoing that the input of the wash solution under the circumstances described with reference to the T fitting having arm 80 are identical to the T fitting having the arm 72 and need not be repeated. It has been mentioned that the conduits 78 and 88 are relatively short. The reason for this is to avoid any reverse flow of wash solution in these conduits such as would cause wash solution from these conduits from entering the respective last-named coils. This would also defeat the optional feature of flushing out these coils when they are emptied toward the analysis station 54 followed by an air-segmented wash solution.

While it has been previously indicated that it may be preferred to vent the immiscible fluid segments such as gas from the sample stream prior to passage of such stream through the analysis station 54 for an analytical determination of the sample, this may not be true in particular types of sample analysis. In such cases the vent, including the arm 48 for the removal of such immiscible fluid segments, is omitted and a bubble detector is added to detect the presence of a bubble at the analysis station 54 and provide for the "viewing" of the sample at the sample station only at intervals when such an immiscible fluid segment is not present in the sight path of such station. The bubble detector may be of the type described in Allowed Smythe and Shamos U.S. Pat. application Ser. No. 369,695 filed on May 25, 1964, assigned to the assignee of the instant invention.

The operation of the modified form of the invention shown in FIG. 2 has been described with respect to the washout of the coils 68, 70 when each is drained with a gas-segmented wash solution for the purpose of avoiding intercontamination of samples, with the understanding that all such immiscible fluid segments such as gas are vented from the system through the arm 48. On the other hand, it may be very desirable to flow such gassegmented wash solution in the form of FIG. 2 through the analysis station 54 between samples to further reduce any tendency of a following sample flowing through such station to be contaminated by a preceding sample. This may be easily accomplished by reducing the volumetric flow of the wash solution into the conduit 75 and into the conduit 84, in the manner described above, to a volumetric rate which is less than 1.20 ml/min. which has been described for example only as the volumetric flow rate of the compressible pump tube 58. The volumetric flow rate discharging from the analysis station 54 may be reduced by replacing the compressible pump tube 58 with a similar pump tube having a smaller inner diameter.

While several forms of the method and apparatus have been illustrated and described, it will be apparent, especially to those versed in the art, that the method and apparatus for automated quantitative fluid analysis are susceptible of various changes in details, and may take other forms without departing from the principles of the invention.

What is claimed is:

1. A method of analyzing a fluid sample for a constituent of interest, comprising the steps of:
flowing the sample along a first conduit portion and outletting the sample from said first conduit portion to the inlet of a second conduit portion;
treating the sample in said second conduit portion to effect a rate reaction of the sample;
reversing the flow of the treated sample in said second conduit portion so that the treatment time of a trailing portion of said sample entering said second conduit portion is less than the treatment time of a leading portion of said sample in said second conduit portion; and
analyzing the sample at a station on the reversal of the flow in said second conduit.

2. A method as defined in claim 1, further including incubating said sample while in said second conduit portion in a temperature-controlled condition.

3. A method as defined in claim 1, further including mixing of the sample while in said second conduit portion.

4. A method as defined in claim 1, wherein: said analysis station comprises a flow cell for photometric analysis.

5. A method as defined in claim 2, wherein: said incubating portion of said conduit is formed as a coil for delay of the fluid through such coil and mixing of the sample.

6. A method as defined in claim 1, wherein: said sample is one of a series of samples flowing one after another along said first conduit portion, the samples being separated from one another, and further including flowing each sample along said second conduit portion and reversing the flow in the latter, one sample at a time.

7. A method as defined in claim 1, wherein: said sample is one of a series of samples flowing one after another along said first conduit portion, the samples being separated from one another by immiscible fluid segments at least along said first conduit portion, and further including flowing each sample along said second conduit portion and reversing the flow therein, one sample at a time.

8. A method as defined in claim 6, further including the step of segmenting each sample with immiscible fluid segments in said first conduit portion.

9. A method as defined in claim 6, wherein: said samples are separated from one another in said first conduit portion by immiscible fluid segments.

10. A method as defined in claim 6, further including the step of switching successive samples between said second and third conduit portions, and successively flowing from said second and third conduit portions the samples to said analysis station.

11. A method as defined in claim 5, wherein: said samples are separated from one another in said first conduit portion by immiscible fluid segments which are removed prior to analyzing each sample.

12. A method as defined in claim 6, wherein: said samples are separated from one another in said first conduit portion by immiscible fluid segments which flow through said analysis station in occluding manner, together with the samples.

13. A method as defined in claim 12, further including means to segment with an immiscible fluid each sample and means to remove all of said immiscible fluid segments prior to flow of the sample to said analysis station.

14. A method as defined in claim 7, wherein: said second conduit portion has an open end, downstream from said first conduit portion, and further including flowing such an immiscible fluid segment preceding a sample out said open end of said second conduit portion prior to reversing the flow of the treated sample in said second conduit portion.

15. A method as defined in claim 14, further including flowing a wash solution into said open end of said second conduit portion following the reverse flow in the last-mentioned portion to cleanse said second conduit portion.

16. A method as defined in claim 15, further including segmenting with a gas said wash solution for washing out said second conduit portion.

17. Apparatus for analyzing a fluid stream for a constituent of interest, comprising:

sample source means;

means flowing the sample from said source means along a first conduit portion and outletting the sample from said first conduit portion to the inlet of the second conduit portion;

means treating the sample in said second conduit portion to effect a rate reaction of the sample;

means reversing the flow of the treated sample in said second conduit portion so that the treatment time of a trailing portion of said sample entering said second conduit portion is less than the treatment time of the leading portion of said sample in said second conduit portion; and means analyzing the sample at a station on the reversal of the flow in said second conduit.

18. Apparatus as defined in claim 17, wherein: said treating means comprises means incubating said sample while in said second conduit portion in a temperature-controlled condition.

19. Apparatus as defined in claim 17, wherein: said second conduit portion comprises means for mixing the sample therein.

20. Apparatus as defined in claim 17, wherein: said analysis station comprises a flow cell for photometric analysis.

21. Apparatus as defined in claim 17, wherein: said means for flowing the sample along said first conduit portion comprising means separating the sample one from another in said first conduit portion by immiscible fluid segments which flow through said analysis station in occluding manner, together with the samples.

22. Apparatus as defined in claim 17, wherein: said sample source means comprises means to separate said sample one from another in said first conduit portion by immiscible fluid segments.

23. Apparatus as defined in claim 17, further including means segmenting each sample with immiscible fluid segments in said first conduit portion.

24. Apparatus as defined in claim 17, wherein: said second conduit portion is formed as a coil for delay of the fluid through such coil and mixing of the sample.

25. Apparatus as defined in claim 17, wherein: said sample source means comprises a sampler having an aspirating probe associated therewith which aspirates successive ones, of a series of samples supported from said sampler, each of which is indexable at an off-take station of said probe, said probe under the influence of said means for flowing the sample along said first conduit portion, aspirating a gas segment prior to immersion into each sample and on leaving each sample, said sampler also having associated therewith a reservoir for wash solution and the probe being operative to aspirate wash solution from said reservoir between successive samples to form a segment of such solution between gas segments isolating successive samples.

26. Apparatus as defined in claim 17, further including means segmenting each sample with immiscible fluid segments in said first conduit portion.

27. Apparatus as defined in claim 17, wherein: said sample is one of a series of samples flowing one after another along said first conduit portion the samples being separated from one another, said means for reversing the flow of the treated sample in said second conduit portion including means flowing each sample from said second conduit portion one after another.

28. Apparatus as defined in claim 17, wherein: said sample from said sample source comprises a series of samples flowing one after another along said first conduit portion, the samples being separated from one another by immiscible fluid segments at least along said first conduit portion, and further including means flowing each sample along said second conduit portion and reversing the flow therein, one sample at a time.

29. Apparatus as defined in claim 17, wherein: said sample source means provides a series of samples flowing one after another along said first conduit portion, the samples being separated from one another, each sample flowing in said second conduit portion and having its flow reversed therein, one sample at a time, and further including a third conduit portion for sample treatment similar to said second conduit portion, and means for switching successive samples flowing along said first conduit portion alternately between said second and third conduit portions, and successively flowing from said second and third conduit portions the samples to said analysis station.

30. Apparatus as defined in claim 23, further including means removing all of said immiscible fluid segments prior to flow of the sample stream to said analysis station.

31. Apparatus as defined in claim 26, wherein: said second conduit portion has an open end, downstream from said first conduit portion, and said means for flowing the sample along said first conduit portion comprises means flowing such an immiscible fluid segment preceding a sample out said open end of the second conduit portion prior to said reversing of the flow of the treated sample in said second conduit portion.

32. Apparatus as defined in claim 29, wherein: said means for switching successive samples comprises valve means automatically switching successive samples in phased relation to the arrival of such samples to said valve means.

33. Apparatus as defined in claim 31, further including means flowing a wash solution into said open end of said second conduit portion following the reverse flow in the last-mentioned portion to cleanse said second conduit portion.

34. Apparatus as defined in claim 33, further including means segmenting with a gas said wash solution for washing out said second conduit portion.

* * * * *